United States Patent
Jorgensen

(10) Patent No.: US 9,817,756 B1
(45) Date of Patent: *Nov. 14, 2017

(54) MANAGING MEMORY IN VIRTUALIZED ENVIRONMENTS

(71) Applicant: Amazon Technologies, Inc., Reno, NV (US)

(72) Inventor: Atle Normann Jorgensen, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 522 days.

This patent is subject to a terminal disclaimer.

(21) Appl. No.: 13/901,346

(22) Filed: May 23, 2013

(51) Int. Cl.
  *G06F 12/08* (2016.01)
  *G06F 12/109* (2016.01)
  *G06F 9/455* (2006.01)

(52) U.S. Cl.
  CPC .......... *G06F 12/08* (2013.01); *G06F 9/45533* (2013.01); *G06F 9/45537* (2013.01); *G06F 12/109* (2013.01)

(58) Field of Classification Search
  CPC .... G06F 12/08; G06F 9/45533; G06F 12/109; G06F 12/1036; G06F 9/45537
  USPC ...................................... 711/106, 6
  See application file for complete search history.

(56) References Cited

U.S. PATENT DOCUMENTS

| | | | | |
|---|---|---|---|---|
| 7,702,843 B1 * | 4/2010 | Chen | ...................... | G06F 9/5016 711/6 |
| 8,966,188 B1 * | 2/2015 | Bardale | ................... | G06F 12/00 711/104 |
| 9,176,787 B2 * | 11/2015 | Low | ..................... | G06F 9/45558 |
| 2008/0109629 A1 * | 5/2008 | Karamcheti | .......... | G06F 9/5016 711/170 |
| 2009/0006801 A1 * | 1/2009 | Shultz | ................... | G06F 9/5016 711/170 |
| 2009/0055693 A1 * | 2/2009 | Budko | .................... | G06F 21/53 714/57 |
| 2012/0047313 A1 * | 2/2012 | Sinha | ...................... | G06F 12/08 711/6 |
| 2012/0137101 A1 * | 5/2012 | Arcese | .................. | G06F 9/5016 711/170 |
| 2013/0275973 A1 * | 10/2013 | Greenfield | .......... | G06F 9/44584 718/1 |
| 2014/0123135 A1 * | 5/2014 | Huang | ................ | H04L 41/5054 718/1 |
| 2014/0196033 A1 * | 7/2014 | Bobroff | ............... | G06F 9/45558 718/1 |
| 2014/0201477 A1 * | 7/2014 | Greenfield | ............ | G06F 9/5016 711/158 |
| 2014/0258670 A1 * | 9/2014 | Venkatasubramanian | ................. | G06F 12/023 711/171 |
| 2014/0304320 A1 * | 10/2014 | Taneja | .................... | H04L 69/16 709/203 |
| 2015/0058580 A1 * | 2/2015 | Lagar Cavilla | ..... | G06F 9/45558 711/149 |

* cited by examiner

*Primary Examiner* — Prasith Thammavong
*Assistant Examiner* — Kenneth Tsang
(74) *Attorney, Agent, or Firm* — Hogan Lovells US LLP

(57) ABSTRACT

Techniques are described for enabling a virtual machine to be presented with an amount of available guest memory, where a hypervisor or other privileged component manages the mapping of the guest memory to either volatile memory (e.g., RAM) or to secondary storage (e.g., SSD). This enables volatile memory to be effectively oversubscribed to on host computing devices that have a limited amount of total available volatile memory but which are running multiple virtual machines. For example, each virtual machine on the device can be presented as having access to the total amount of available RAM that is available on the device. The hypervisor or other virtualization component then monitors the usage of the memory by each virtual machine and shapes which portions of the guest memory for that virtual machine are mapped to RAM and which portions are mapped to secondary storage, such as SSD.

19 Claims, 8 Drawing Sheets

¹ …

MANAGING MEMORY IN VIRTUALIZED ENVIRONMENTS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances (i.e. virtual machines) that are associated with (e.g., owned by) a particular user (e.g., customer). Conventionally, each virtual machine running on a host computing device is assigned a portion of memory (e.g., random access memory), processing capacity and/or other resources available on that device. However, some virtual machines frequently remain idle over relatively long time intervals, and only need access to their respective portions of memory during short periods of time. During such idle time intervals, the memory which has been allocated to those virtual machines is generally not being utilized. In some cases, it would be desirable to utilize such unused memory capacity in some efficient way, without severely impacting the virtual machines during the times when they do need access to the memory.

BRIEF DESCRIPTION OF THE DRAWINGS

Various embodiments in accordance with the present disclosure will be described with reference to the drawings, in which.

DETAILED DESCRIPTION

Figure 1:
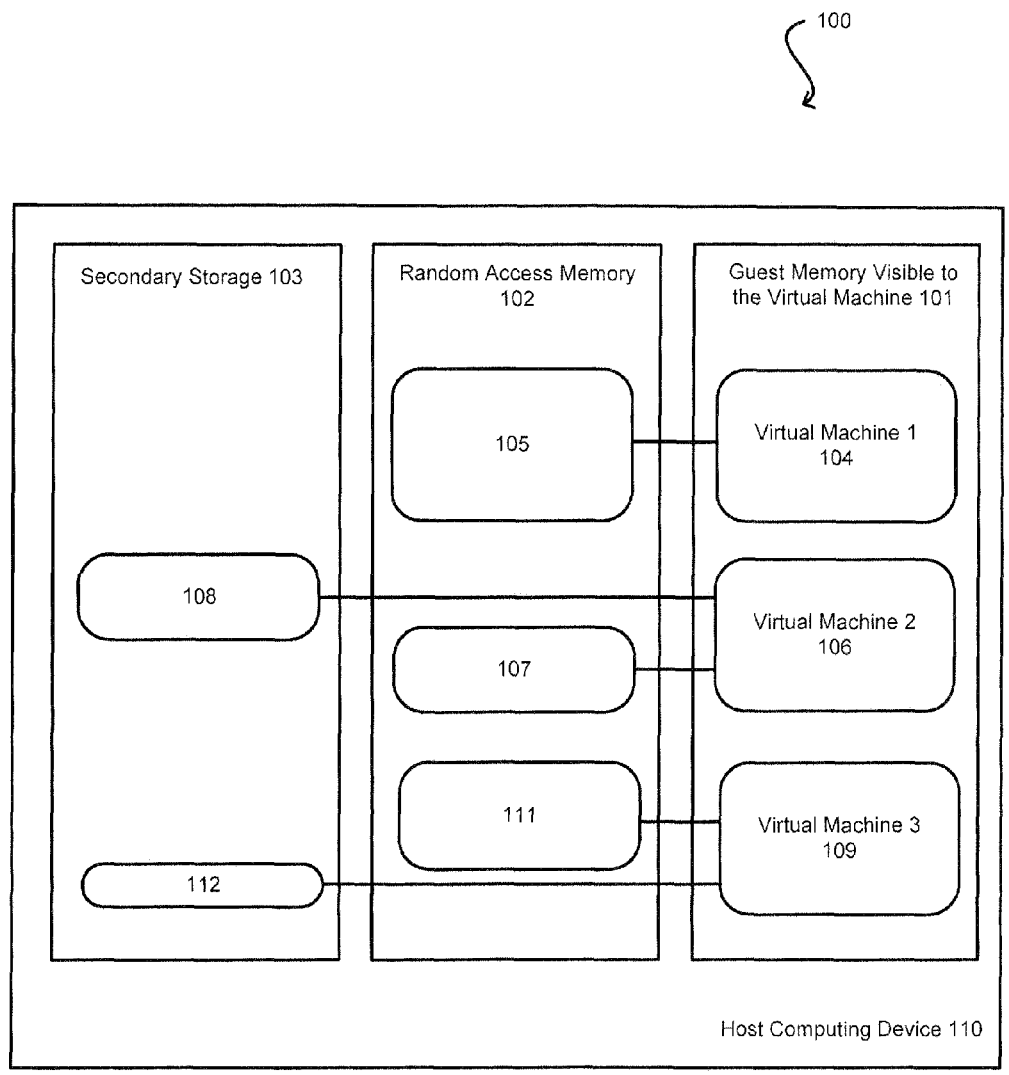
FIG. 1 illustrates an example of shaping memory for a virtual machine by mapping portions of memory to RAM and portions to secondary storage, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing access to computer memory, such as within virtualized computing environments. In particular, various embodiments enable a virtual machine to be presented with an amount of available guest memory, where a hypervisor or other privileged component manages the mapping of the available guest memory to either primary memory (e.g., random access memory (RAM)) or to secondary storage (e.g., solid state drive (SSD)). Consequently, from the perspective of the virtual machine, it appears as though the virtual machine has access to an entire set of primary memory (e.g., RAM), however, in reality, the hypervisor (or other such component) may be mapping a portion of the available guest memory to RAM and another portion to SSD. This enables the primary memory (e.g., RAM) to be effectively oversubscribed to on host computing devices that have a limited amount of total available primary memory but which are running multiple virtual machines. For example, each virtual machine on the device can be presented as having access to the total amount of available RAM that is available on the device. The hypervisor or other virtualization component then monitors the usage of the memory by each virtual machine and shapes which portions of the available guest memory for that virtual machine are mapped to RAM and which portions are mapped to secondary storage, such as SSD.

In various embodiments, the mapping of guest memory to primary memory and to secondary storage may be performed according to an algorithm, such as a "leaky bucket" type of algorithm. In some embodiments, the hypervisor (or other component) monitors the usage of the available memory by each virtual machine either continuously or periodically (e.g., over one or more time intervals). When the hypervisor detects that a particular virtual machine has been using a large amount of memory (e.g., larger than a threshold), the hypervisor may begin to transfer portions of the memory assigned to the virtual machine to secondary storage, thereby increasing the portion of guest memory mapped to secondary storage. Similarly, when the hypervisor detects that the virtual machine has been using a lesser amount of memory (e.g., less than another threshold) over the time interval, the hypervisor may begin to gradually transfer portions of memory from secondary storage back to RAM, thereby increasing the portion of guest memory mapped to RAM. The hypervisor may allocate to the virtual machine an allowable amount of RAM for each time interval, such that the virtual machine is able to accumulate the RAM over a plurality of time intervals if the virtual machine did not utilize the RAM allocated to it during those time intervals. This allows virtual machines that are frequently idle to obtain temporary bursts of high performance due to the accumulated available RAM by those virtual machines. Because RAM is generally accessed more efficiently (i.e. with lower latency) than secondary storage, virtual machines that have a larger portion of their guest memory mapped to RAM will generally see an improvement in performance for memory input/output (I/O) operations. Accordingly, in at least some embodiments, the memory shaping and oversubscription described herein may be especially useful for those virtual machines that need relatively short periods of high performance followed by mostly idle intervals.

The processes of oversubscribing and shaping memory for virtual machines described above can be utilized within the context of a virtualized computing environment, such as a multitenant public or private cloud. In this type of environment, an operator of the virtualized computing environment (e.g., service provider) may provide access to physical resources, such as host computing devices, to its users (e.g., customers) and allow the users to execute their programs using the physical resources of the service provider. For example, each host computing device can include a hypervisor (or other virtualization component) that hosts one or more guest virtual machines. Each virtual machine can be owned by a particular user and can execute a service or application using the physical resources (i.e., host computing device) of the virtualized computing environment. The user can request, access and manage the virtual machine assigned to them via APIs and other management tools.

FIG. 1 illustrates an example 100 of shaping memory for a virtual machine by mapping portions of memory to RAM and portions to secondary storage, in accordance with various embodiments.

Conventionally, the virtual machines on a host computing device are often assigned a portion of the available memory (e.g., RAM) on the device. For example, conventionally, if the host computing device had one gigabyte of available RAM, and if the host computing device were running two virtual machines, each virtual machine might be assigned 500 megabytes of RAM (if memory were to be distributed evenly). In contrast, in various embodiments described herein, the virtual machines running on a host computing device may be presented with an amount of available memory that, in combination, exceeds the total amount of available RAM on the device. Following the example illustrated above, if the host computing device has one gigabyte of total available RAM, each of the two virtual machines running on the device may be presented as having access to the entire one gigabyte of addressable memory (e.g., guest memory). This is colloquially referred to herein as oversubscribing the memory of the host computing device because if the two virtual machines both simultaneously attempted to use the entirety of the available memory presented (e.g., made visible) to them, there would not be enough available RAM on the host computing device to support their operations. In order to account for such oversubscription, the hypervisor or other component (e.g., virtual machine manager, etc.) may map a portion of the available memory to primary memory (e.g., RAM) and another portion of the available memory to secondary storage (e.g., SSD). A hypervisor (or other virtualization component) typically has full control over the page translation tables that map the virtual memory real physical memory and thus, the hypervisor can perform the memory shaping operations to map the different portions to RAM or secondary storage. Hypervisors and other virtualization components will be described in further detail later in this disclosure, with reference to FIGS. 3 and 4.

As shown in the illustration of FIG. 1, a virtual machine operating on a host computing device 110 can be presented with an amount of available guest memory 101. For example, virtual machine 1 may be presented as having available guest memory 104, while virtual machine 2 is presented as having available guest memory 106 and virtual machine 3 is presented as having guest memory 109. Each virtual machine may submit input/output (I/O) operations to access the memory made visible to them and a hypervisor or other privileged component may be responsible for mapping the portions of guest memory to either primary memory or secondary storage opaquely with respect to the virtual machines (i.e., without exposing information about the memory being mapped in such a way to the virtual machines). In various embodiments, the primary memory is the area of memory that is determined to be more efficiently accessed by the central processing unit (CPU) than the secondary storage. For example, the primary memory may comprise random access memory (RAM), such as the RAM available in a dual in-line memory module (DIMM) embedded in a host computing device, which comprises a series of dynamic random-access memory integrated circuits. In various embodiments, the secondary storage may comprise any secondary storage location that can be accessible by the CPU of the host computing device, including but not limited to a solid state drive (SSD), flash memory, hard disks, optical drives, a memory location on a remote server accessible over a network connection, and the like.

In various embodiments, the hypervisor monitors the usage of the guest memory by the virtual machine over various time intervals. When the hypervisor detects that the usage by a particular virtual machine is exceeding a threshold (e.g., defined threshold, dynamically computed threshold, etc.), the hypervisor may begin to progressively increase the portion of guest memory of that virtual machine that is mapped to the secondary storage. For example, the hypervisor may begin to transfer (e.g., copy) one or more memory pages (e.g., memory blocks) from RAM to secondary storage. In one embodiment, the memory pages transferred to secondary storage may be the least frequently used (LFU) pages. For example, the system may keep track of the number of times a memory page is referenced in RAM, i.e., the reference frequency. When the hypervisor determines that some memory pages should be transferred from RAM to secondary storage, the system will copy the memory page(s) with the lowest reference frequency to secondary storage and then purge those memory pages from RAM. In alternative embodiments, the hypervisor may select the memory pages to be transferred by applying a different algorithm, such as by selecting random memory pages to transfer from RAM to secondary storage.

In various embodiments, the hypervisor may continue monitoring the usage of the available guest memory by each virtual machine on the device. When the hypervisor detects that the usage of the virtual machine has decreased below another threshold, the hypervisor may progressively increase the portion of guest memory mapped to RAM for that virtual machine. For example, the hypervisor may transfer one or more memory pages from secondary storage to RAM. In one embodiment, the hypervisor transfers the most frequently used memory pages from secondary storage to RAM. For example, as described above, the system may keep track of the reference frequency for each memory page in secondary storage. When the hypervisor determines that some memory pages should be transferred from secondary storage to RAM, the system will copy the memory page(s) with the highest reference frequency to RAM and then purge those memory pages from secondary storage. In alternative embodiments, the hypervisor may select the memory pages to be transferred by applying a different algorithm, such as by selecting random memory pages to transfer to from secondary storage to RAM.

As illustrated in FIG. 1, the portions of guest memory mapped to either primary memory or secondary storage may change over time. In particular, the illustration in FIG. 1 shows an example of the memory mappings at one point in time and the illustration in FIG. 2 shows an example of the memory mappings at a different point in time, after which some memory shaping operations have been performed by the hypervisor.

In FIG. 1, the entire portion of guest memory 104 presented (e.g., made accessible) to virtual machine 1 is mapped to the portion of RAM 105. For virtual machine 2, a first portion 107 of the guest memory is mapped to RAM and a second portion 108 is mapped to secondary storage. Similarly, for virtual machine 3, a first portion 111 of the guest memory is mapped to RAM, while a second portion 112 of the guest memory is mapped to secondary storage. As mentioned above, the mappings of memory can change over time, depending on the memory usage by each virtual machine. Thus each virtual machine instance sees a stable RAM size (e.g., 4 GB) but behind the scenes, the hypervisor can decide how much actual RAM each virtual machine is allowed to access at any given time based on previous usage by that virtual machine, such that the remaining portion of the guest memory is mapped to secondary storage. In various embodiments, the hypervisor may apply an algorithm, such as a leaky bucket type of algorithm, to make the determinations as to how much RAM the virtual machines can access.

Figure 2:
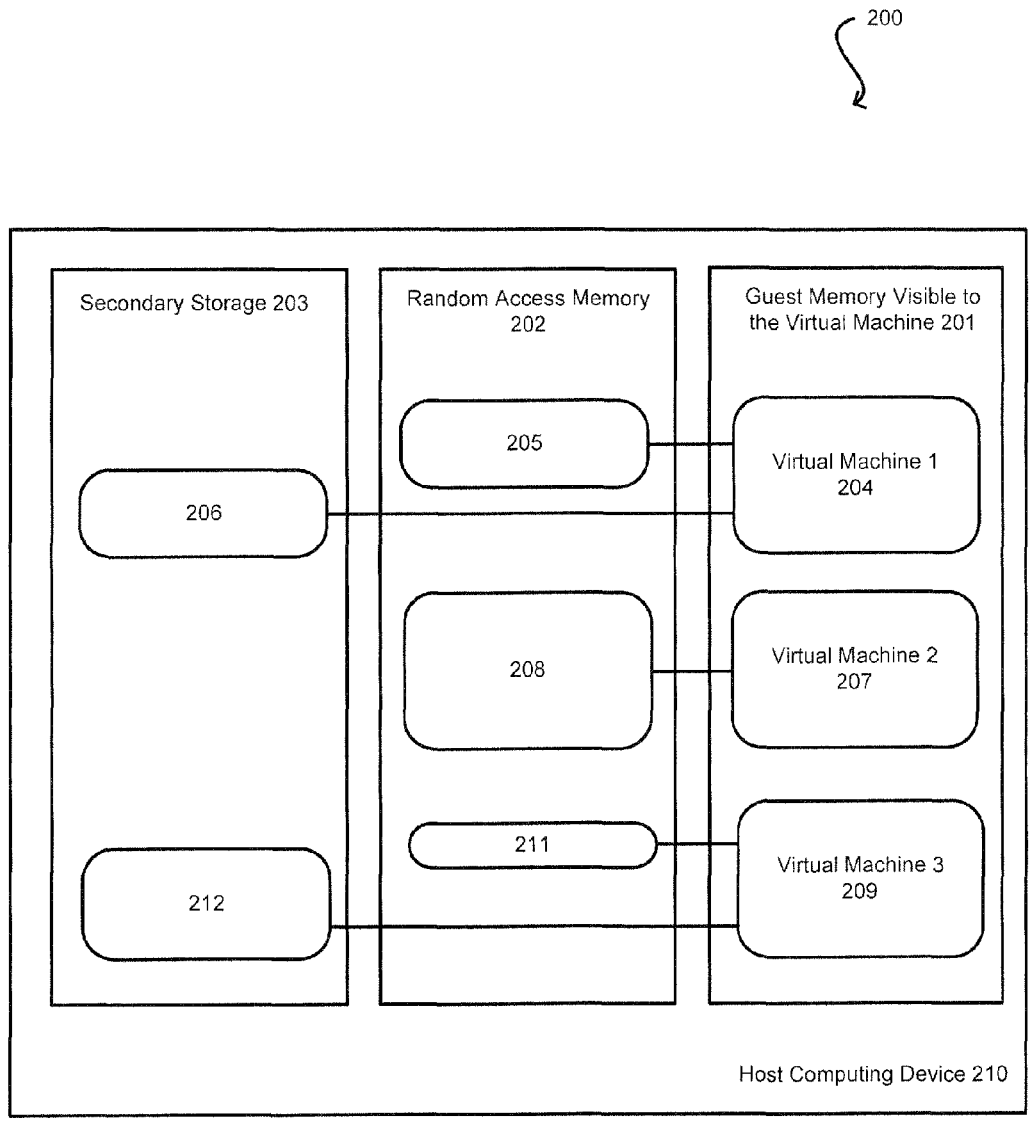
FIG. 2 illustrates an example where portions of guest memory have been mapped to secondary storage and other portions to RAM as a result of memory shaping operations by the hypervisor, in accordance with various embodiments.

FIG. 2 illustrates an example 200 where portions of guest memory have been mapped to secondary storage and other portions to RAM as a result of memory shaping operations by the hypervisor, in accordance with various embodiments. Comparing the illustrations of FIG. 1 to FIG. 2, the memory usage by virtual machine 1 has exceeded a threshold over a time interval (i.e., the virtual machine 1 has been using all its "real memory time" allowed to it) and the hypervisor has transferred a portion of its memory pages to secondary storage 203. As a result of these memory shaping operations, in FIG. 2, a first portion 205 of the available guest memory 204 of virtual machine 1 is in RAM 202 and a second portion 206 of the available guest memory is mapped to secondary storage 203. Virtual machine 2 has been substantially idle and consequently, the hypervisor has transferred the entire portion 208 of its available guest memory into RAM. The usage of virtual machine 3 has remained relatively stable, and as a result, a larger portion 211 of guest memory of virtual machine 3 has been mapped to secondary storage, while a smaller portion 210 remains mapped to RAM. It should be noted that the illustration shown in FIG. 2 is only one of many possible scenarios that may occur due to the memory shaping operations performed based on the memory usage by the virtual machines.

In at least some embodiments, each virtual machine may be allowed a certain amount of memory (e.g., RAM) use per time unit. The virtual machine may be allowed to accumulate that allowed memory (e.g., RAM) over time intervals when it does not utilize that memory. For example, when the virtual machine has accumulated enough memory usage "credits," the virtual machine may be allowed to spike and use up all those credits. After the virtual machine has used up its allowed memory use (e.g., "credits"), the accumulated reserve (e.g., "bucket") is empty and the hypervisor may begin to transfer that virtual machine's memory to secondary storage (e.g., SSD). Over time, the virtual machine may begin to accumulate more credits and it may begin to use volatile memory (RAM) again. In various embodiments, as the virtual machine accumulates memory usage, the hypervisor may transfer the blocks from secondary storage to RAM.

In at least some embodiments, the amount of RAM allocated to each virtual machine may be dependent on the priority associated with the virtual machine. For example, higher priority virtual machines may be allocated a higher amount of allowable RAM per time interval than lower priority virtual machines. Alternatively, higher priority virtual machines may not be subject to a limit at all and may be allowed to map all of their memory I/O operations to RAM. The priority of the virtual machine may be assigned based on the customer that owns the virtual machine. For example, certain customers may pay a premium price for their virtual machines and these customers may receive high priority virtual machines that are backed by higher amounts of RAM than virtual machines belonging to other customers. In some embodiments, a customer may selectively opt in to the memory shaping feature described herein and have portions of their instance's memory mapped to secondary storage in order to reduce the price paid for the virtual machine. In this manner, the operator or service provider of the virtualized environment may place the virtual machines of those customers that have opted in for the memory shaping feature on the same host computing devices in order to more efficiently utilize the hardware resources.

Figure 3:
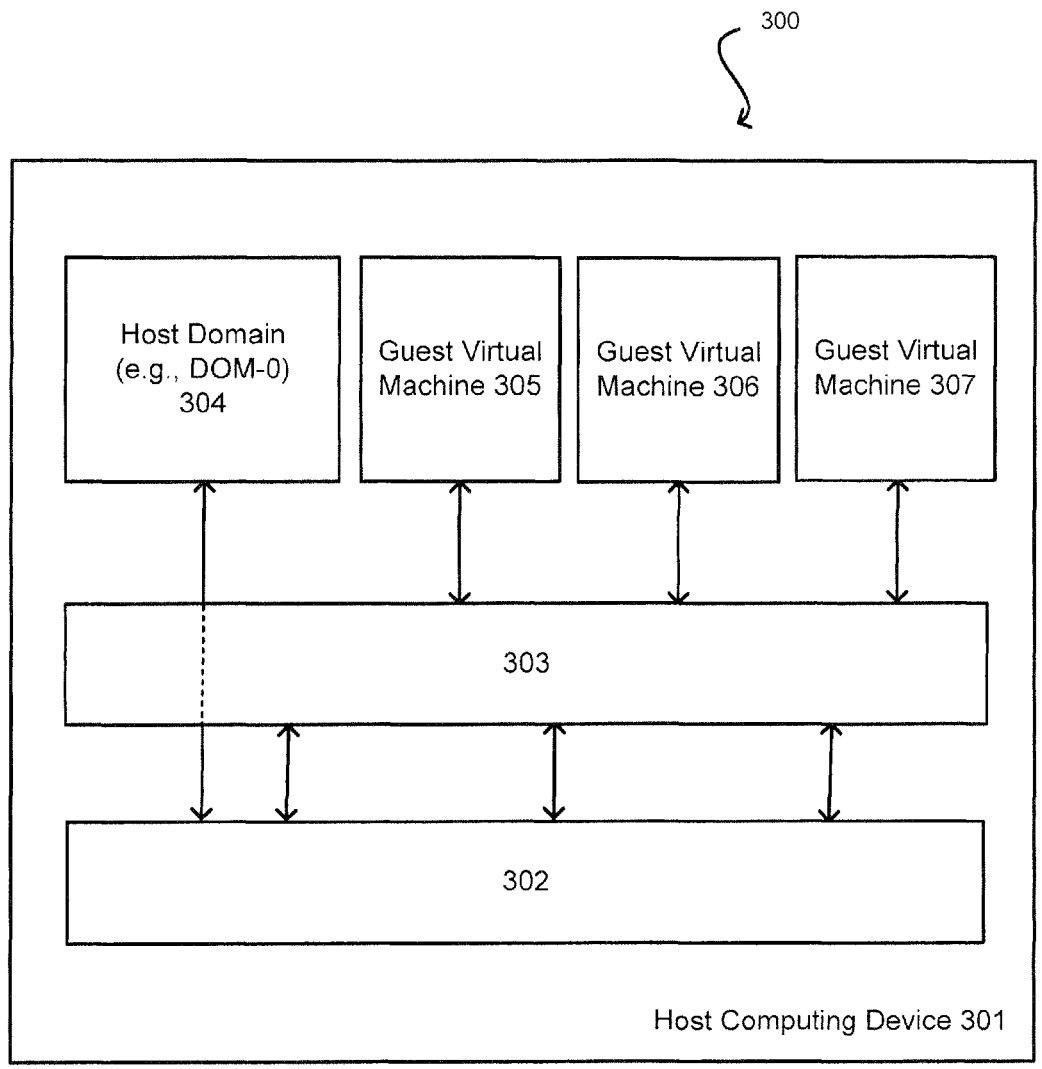
FIG. 3 illustrates an example of utilizing one virtualization technique on a host computing device by using a hypervisor, in accordance with various embodiments.

As previously mentioned, a virtual machine may be operating on a host computing device that resides in a resource center of a service provider or other operator of the virtualized computing environment. On the host computing device, a number of virtualization techniques can be used to simultaneously operate a plurality of guest virtual machines or guest operating systems. FIG. 3 illustrates an example 300 of utilizing one virtualization technique using a hypervisor, in accordance with various embodiments. The hardware 302 of the host computing device 301 interfaces with a hypervisor 303 running directly on the hardware 302 (e.g., a "bare metal" or native hypervisor). Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 304 that may include an administrative operating system for configuring the operation and functionality of the hypervisor 303, as well as that of domains of lower privilege, such as the domains or the guest virtual machines (305, 306, 307) or other operating systems, which may be heterogeneous (e.g., running different operating systems than each other). The host domain 304 (e.g., DOM-0) may have direct access to the hardware resources 302 of the host computing device 301 by way of the hypervisor 303, while the guest virtual machine domains (305, 306, 307) may not.

In various embodiments, the hypervisor 303 manages the mappings of virtual memory to physical memory in order to enable operations by the guest virtual machines (305, 306, 307). The hypervisor 303 has full control over the memory translation tables and is therefore able to remap virtual memory allocated to a virtual machine from RAM to secondary storage and vice versa. Because the virtual machines are not provided the mapping information, the hypervisor may remap the virtual memory opaquely with respect to the virtual machines.

Figure 4:
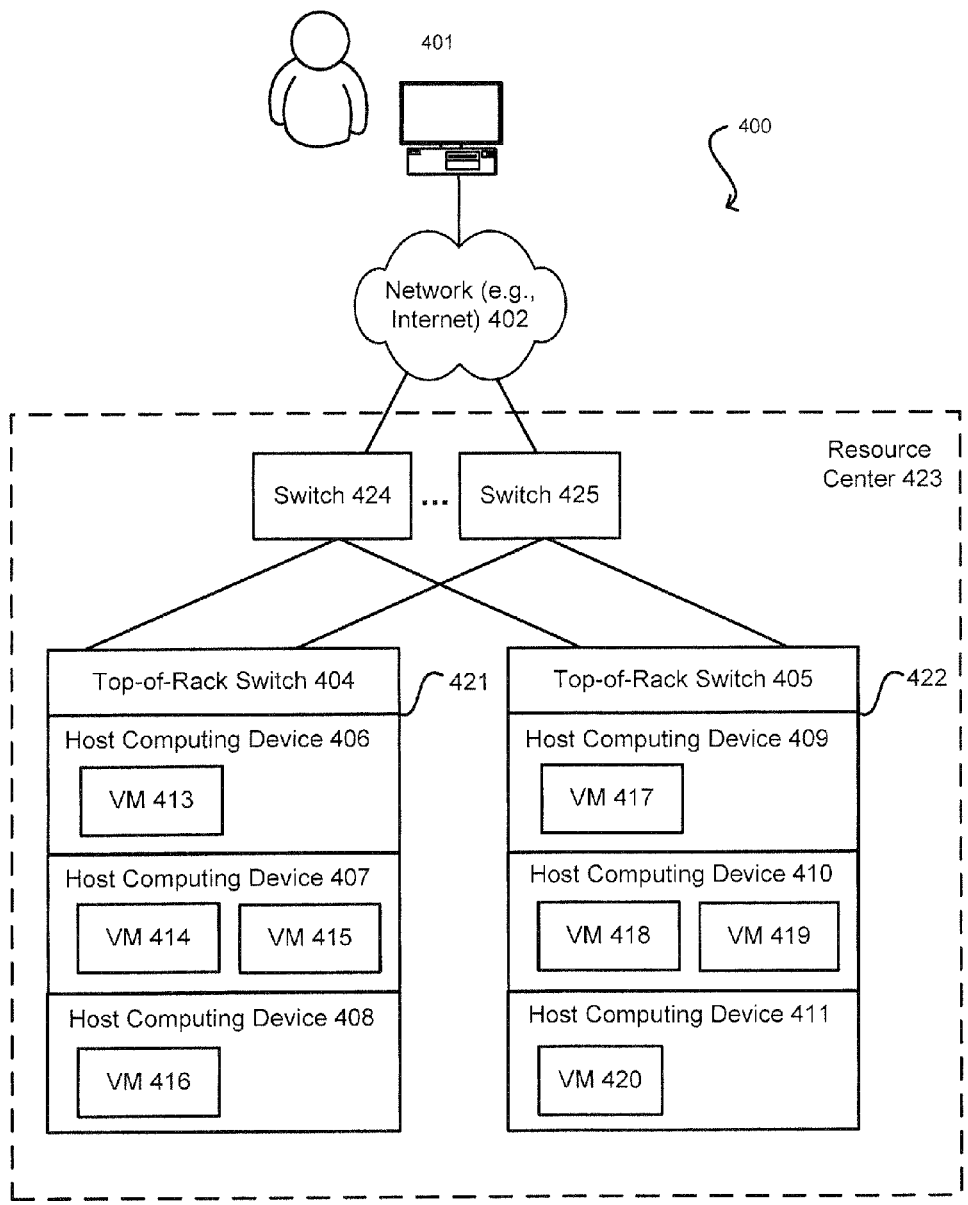
FIG. 4 illustrates an example of a resource center of a service provider that provides the physical resources that can be used to enable a virtualized computing environment, in accordance with various embodiments.

FIG. 4 illustrates an example 400 of a resource center of a service provider that provides the physical resources that can be used to enable a virtualized computing environment, in accordance with various embodiments. In the illustrated embodiment, a service provider (or other operator of the virtualized computing environment) can maintain one or more resource centers 423 (e.g., data centers, server farms, etc.) that store the physical resources (e.g., host computing devices, etc.) of the service provider. The resource centers may be located in different geographic locations to provide improved redundancy and failover, as well as more localized access to resources. The physical resources can be used to host a number of virtual machines or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual networks and the like.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419) that have been provisioned for the users (e.g., customers) of the service provider to execute the various applications and services on behalf of those users. Each virtual machine can be provisioned with its own operating system (OS) including a kernel, drivers, process management and the like.

When a user (e.g., customer) wishes to obtain a virtual machine instance, the user can first submit a request to the service provider, indicating the type of VM they would like to use. The service provider (or other operator) may carry out the processes to provision the virtual machine instance which will be hosted on the physical resources (e.g., host computing devices) of the service provider. After the virtual machine has been provisioned, the user may access the virtual machine using one or more application programming interfaces (APIs) provided by the operator of the virtualized environment. The user may use those APIs to manage their virtual machine and to perform various functions associated with the virtual machine (e.g., start the virtual machine, stop or suspend the virtual machine, specify or update configuration information for the virtual machine, etc.).

Figure 5:
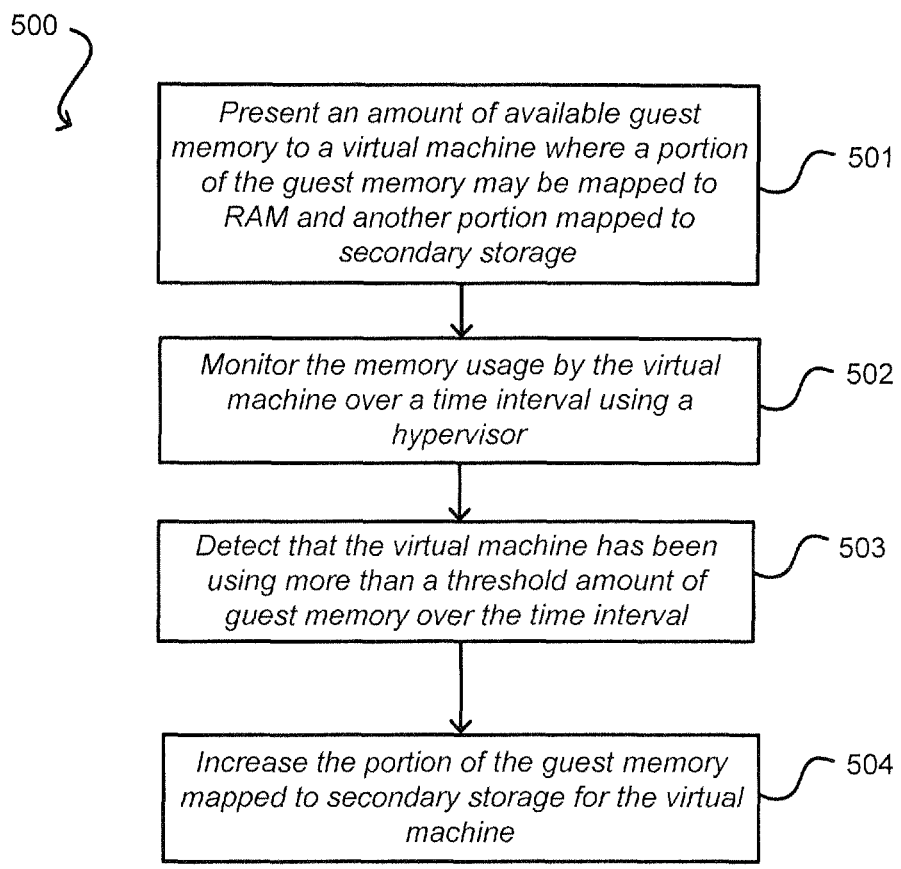
FIG. 5 illustrates an example process for increasing a portion of a virtual machine's memory mapped to secondary storage based on usage, in accordance with various embodiments.

FIG. 5 illustrates an example process 500 for increasing a portion of a virtual machine's memory mapped to secondary storage based on usage, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, a virtual machine is presented an amount of available guest memory that is addressable (e.g., accessible) by the virtual machine. As previously described, the virtual machine may be executed on a host computing device and may be managed by a hypervisor, which may also be managing a number of other virtual machines. In some cases, the virtual machines executed on a single host computing device may be owned (e.g., associated with) different users that can remotely access their respective virtual machines. The amount of guest memory available to each virtual machine may in some cases correspond to the total amount of RAM (or other volatile memory) available on the host computing device. In some cases, this may create memory oversubscription, where the combined total of memory assigned across all of the virtual machines equals to an amount that is greater than actually available on the host computing device. In order to account for this, the hypervisor may be configured to map portions of guest memory to RAM and other portions to secondary storage based at least in part on the memory usage by each virtual machine.

In operation 502, the hypervisor monitors the memory usage by the virtual machine over a time interval. The monitoring may be performed by keeping track of input/output (I/O) operations submitted by the virtual machine to the hypervisor. Since the hypervisor by its nature keeps track of such operations by the virtual machines, the hypervisor may additionally shape the memory according the usage without significant additional latency. In operation 503, based on the usage monitoring, the hypervisor may detect that the virtual machine has been using more than a threshold amount of memory over the monitored time interval. For example, the hypervisor may detect that the virtual machine has exceeded its accumulated amount of RAM usage. In response to the detection, the hypervisor increases the portion of guest memory mapped to the secondary storage for the virtual machine, as shown in operation 504. In some embodiments, the hypervisor gradually starts increasing the portion in secondary storage by transferring memory pages to secondary storage over a period of time. For example, the hypervisor may begin to transfer the least recently used memory pages from the RAM into the secondary storage.

Figure 6:
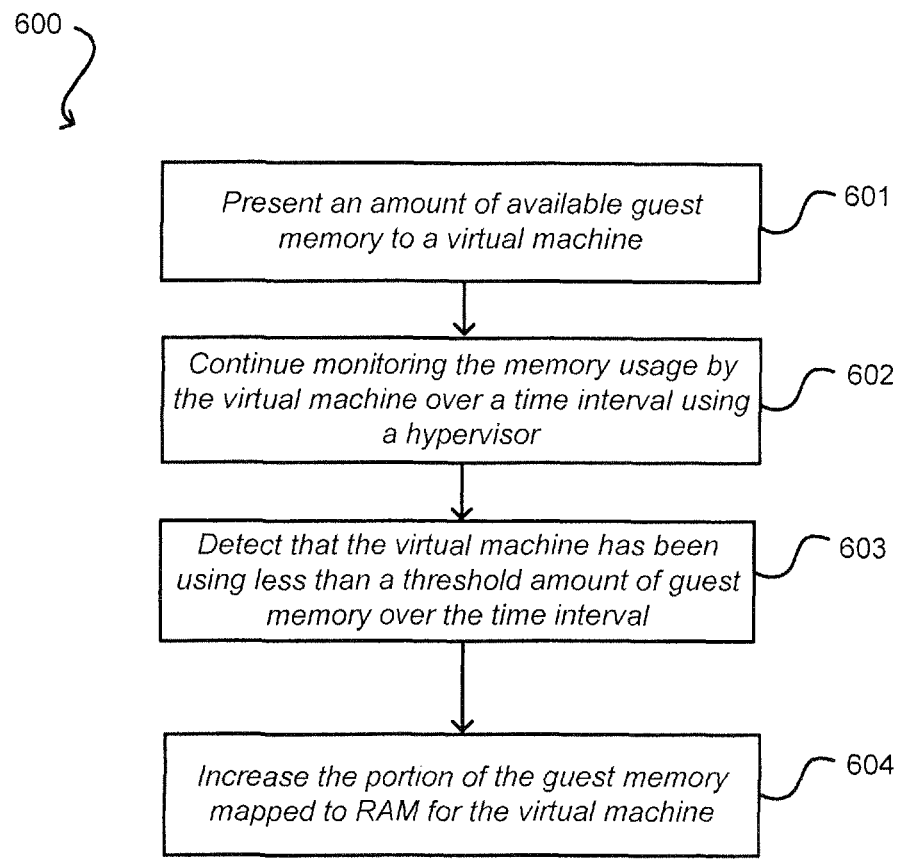
FIG. 6 illustrates an example process for increasing a portion of a virtual machine's memory mapped to random access memory based on usage, in accordance with various embodiments.

FIG. 6 illustrates an example process 600 for increasing a portion of a virtual machine's memory mapped to random access memory based on usage, in accordance with various embodiments. In operation 601, the virtual machine is presented with an amount of available memory and the hypervisor may continue monitoring the memory usage (operation 602) by the virtual machine. For example, the hypervisor may continue monitoring the memory usage after the portion of the available memory has been transferred to secondary storage, as previously described in FIG. 5.

In operation 603, the hypervisor detects that the virtual machine has been using less than a threshold amount of memory over the time interval. For example, the hypervisor may determine that the virtual machine has remained idle for a period of time and once again accumulated an amount of memory that it is allowed to use. In various embodiments, the threshold for determining that the virtual machine has been underutilizing the memory allowed to it can be different from the threshold for determining that the virtual machine has been over-utilizing the memory allowed to it. If the hypervisor has determined that the virtual machine has been using less than the allowed threshold of memory, the hypervisor may increase the portion of guest memory mapped to RAM for the virtual machine. For example, the hypervisor may transfer one or more least frequently used memory pages from secondary storage to RAM in response to detecting that the virtual machine has been underutilizing the memory allowed to it.

Figure 7:
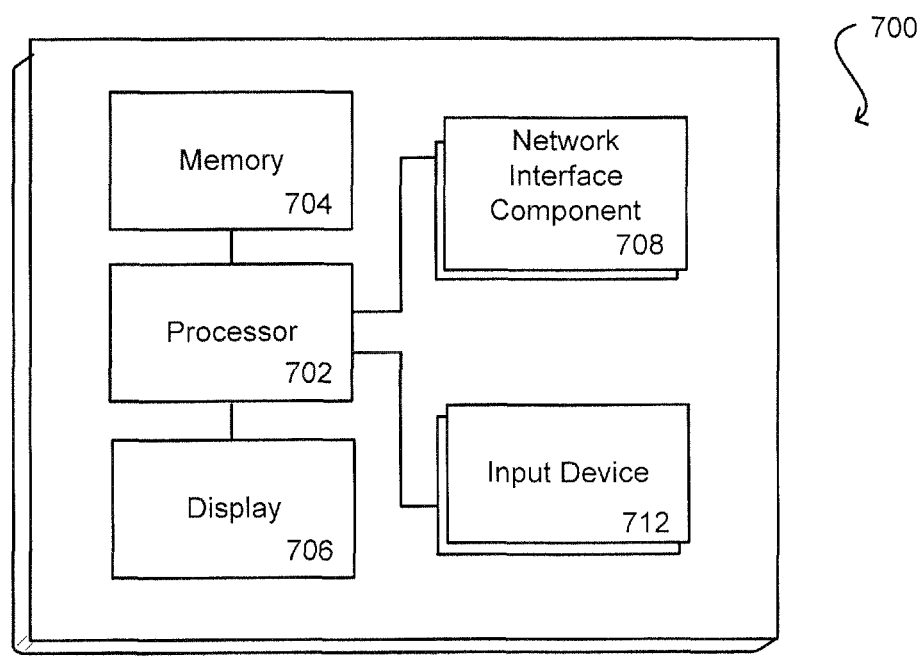
FIG. 7 illustrates a logical arrangement of a set of general components of an example computing device that can be utilized in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
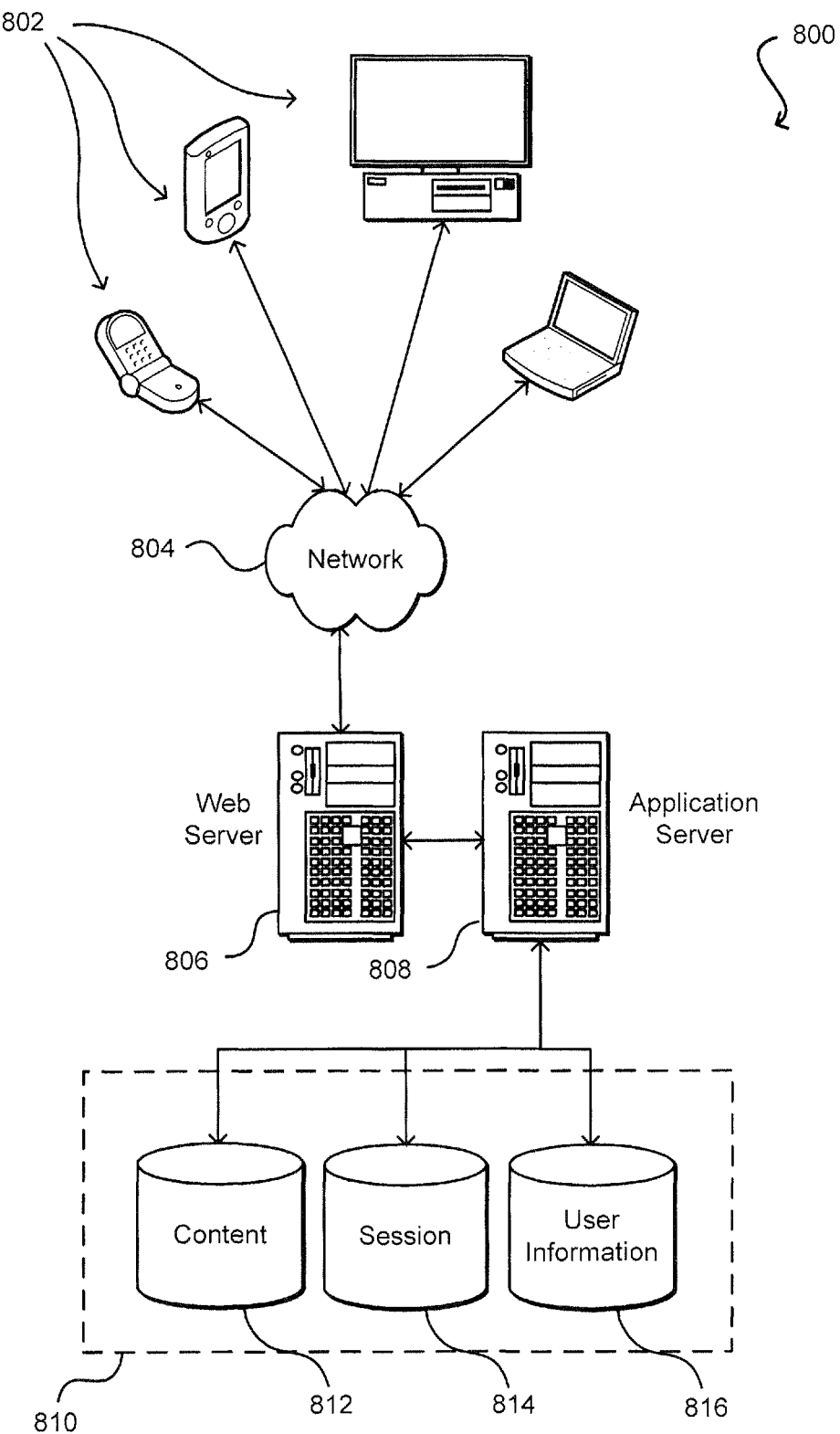
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 1006. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing one or more sequences of instructions, which when executed by one or more processors to cause a computing system to:
expose an amount of guest memory to a virtual machine running on a host computing device, the host computing device including a hypervisor managing the virtual machine;
map, by the hypervisor, a first portion of the guest memory to random access memory (RAM) and map a second portion of the guest memory to secondary storage;
receive, from the virtual machine to the hypervisor, one or more operations addressing the guest memory;
monitor, by the hypervisor, usage of the guest memory by the virtual machine over a time interval of a plurality of time intervals;
detect that the usage of the guest memory over the time interval is higher than a first threshold, based at least in part on the usage from the monitoring by the hypervisor;
increasing the second portion of the guest memory mapped to the secondary storage over a subsequent time interval based at least in part on the detecting that the usage of the guest memory is higher than the first threshold;
detect that the usage of the guest memory over the time interval is lower than a second threshold, the first threshold different from the second threshold and based at least in part on usage from the monitoring by the hypervisor; and
increase the first portion of the guest memory mapped to the RAM over the subsequent time interval based at least in part on the detecting that the usage of the guest memory is lower than the second threshold.

2. The non-transitory computer readable storage medium of claim 1, wherein the host computing device executes a plurality of virtual machines, wherein the guest memory presented to each of the plurality of virtual machines corresponds to a total amount of RAM available on the host computing device.

3. The non-transitory computer readable storage memory of claim 1, wherein the hypervisor is further configured to:
transfer one or more memory pages from the RAM to the secondary storage in order to increase the second portion of the guest memory mapped to secondary storage; and
transfer the one or more memory pages from the secondary storage to the RAM in order to increase the first portion of the guest memory mapped to the RAM.

4. The non-transitory computer readable storage medium of claim 1, wherein the hypervisor is configured to allocate to the virtual machine an allowable amount of the RAM for each time interval of a plurality of time intervals, the allowable amount of RAM indicating an amount of RAM the virtual machine is allocated for use, wherein the virtual machine is capable of accumulating the allowable amount of the RAM over the plurality of time intervals.

5. A computer implemented method, comprising:
exposing an amount of guest memory to a virtual machine;
mapping the amount of the guest memory to at least one of: primary memory or secondary storage;
monitoring usage of the guest memory by the virtual machine over a time interval of a plurality of time intervals;
detecting that the usage of the guest memory by the virtual machine over the time interval at least meets or exceeds a threshold, based at least in part on the usage from the monitoring by the hypervisor;
increasing a portion of the guest memory mapped to the secondary storage over a second time interval subsequent to the time interval based at least in part on the detecting that the usage of the guest memory at least meets or exceeds the threshold;
detecting that the usage of the guest memory over the time interval is lower than an alternate threshold, the alternate threshold being different from the threshold and based at least in part on the usage from the monitoring by the hypervisor; and
increasing an alternate portion of the guest memory that is mapped to the primary storage over the second time interval subsequent to the time interval, the increasing for the alternate portion based at least in part on the usage of the guest memory being lower than the alternate threshold.

6. The computer implemented method of claim 5, wherein primary memory is random access memory (RAM) and wherein secondary storage is at least one of: a solid state drive (SSD) or a remote device accessible over a network connection.

7. The computer implemented method of claim 5, further comprising:
allocating, to the virtual machine, an allowable amount of the primary memory for each time interval of a plurality of time intervals;
enabling the virtual machine to accumulate the allowable amount of the primary memory of the plurality of time intervals.

8. The computer implemented method of claim 7, wherein detecting that the usage of the guest memory by the virtual machine at least meets or exceeds a threshold further comprises:
determining that the usage of the guest memory by the virtual machine meets or exceeds the allowable amount of the primary memory accumulated by the virtual machine.

9. The computer implemented method of claim 7, wherein the virtual machine is associated with a priority, and wherein the allowable amount of the primary memory allocated to the virtual machine is dependent on the priority of the virtual machine, such that virtual machines with a higher priority are allocated a larger amount of the primary memory than virtual machines with a lower priority.

10. The computer implemented method of claim 5, wherein the virtual machine is executed on a host computing device that includes a hypervisor, the hypervisor configured to:
transfer one or more memory pages from the primary memory to the secondary storage in order to increase the portion of the guest memory mapped to the secondary storage.

11. The computer implemented method of claim 10, wherein the one or more memory pages transferred from the primary memory to the secondary storage are pages that have been accessed least frequently over the time interval.

12. The computer implemented method of claim 10, wherein the host computing device executes a plurality of virtual machines, wherein the guest memory presented to each of the plurality of virtual machines corresponds to a total amount of primary memory available on the host computing device.

13. The computer implemented method of claim 5, further comprising:
providing a user with access to the virtual machine by exposing at least one application programming interface (API) for managing the virtual machine, the at least one API accessible over a network.

14. A computing system, comprising:
at least one processor; and
memory including instructions that, when executed by the at least one processor, cause the computing system to:
expose an amount of guest memory to a virtual machine;
map the amount of the guest memory to at least one of: volatile memory or secondary storage;
monitor usage of the guest memory by the virtual machine over a time interval of a plurality of time intervals;
detect that the usage of the guest memory by the virtual machine over the time interval at least meets or exceeds a threshold, based at least in part on the usage from the monitoring by the hypervisor;
increase a portion of the guest memory mapped to the secondary storage over a subsequent time interval based at least in part on the detecting that the usage of the guest memory at least meets or exceeds the threshold;
detect that the usage of the guest memory over the time interval is lower than an alternate threshold, the alternate threshold being different from the threshold and based at least in part on the usage from the monitoring by the hypervisor; and
increase an alternate portion of the guest memory that is mapped to the volatile memory over the subsequent time interval, the increasing of the alternate portion based at least in part on the usage of the guest memory being lower than the alternate threshold.

15. The computing system of claim 14, wherein volatile memory is random access memory (RAM) and wherein secondary storage is a solid state drive (SSD).

16. The computing system of claim 14, wherein the memory further includes instructions that, when executed by the at least one processor, cause the computing system to:
allocate, to the virtual machine, an allowable amount of the volatile memory for each time interval of a plurality of time intervals; and
enable the virtual machine to accumulate the allowable amount of the volatile memory of the plurality of time intervals.

17. The computing system of claim 16, wherein detecting that the usage of the guest memory by the virtual machine at least meets or exceeds a threshold further comprises:
determining that the usage of the guest memory by the virtual machine meets or exceeds the allowable amount of the volatile memory accumulated by the virtual machine.

18. The computing system of claim 14, wherein the virtual machine is executed on a host computing device that includes a hypervisor, the hypervisor configured to:
transfer one or more memory pages from the volatile memory to the secondary storage in order to increase the portion of the available virtual memory mapped to the secondary storage.

19. The computing system of claim 18, wherein the host computing device executes a plurality of virtual machines, wherein the available virtual memory presented to each of the plurality of virtual machines corresponds to a total amount of volatile memory available on the host computing device.

* * * * *